3,050,511
BLOCK COPOLYMERS OF ALKENYL AROMATIC HYDROCARBONS AND ALKYLENE OXIDES
Michael M. Szwarc, Syracuse, N.Y., assignor to The Dow Chemical Company, Midland, Mich., a corporation of Delaware
No Drawing. Filed Sept. 15, 1958, Ser. No. 760,866
4 Claims. (Cl. 260—93.5)

This invention concerns copolymers of alkenyl aromatic hydrocarbons and alkylene oxides of the block or graft copolymer type. It relates more particularly to block copolymers comprised of a polymerized alkenyl aromatic hydrocarbon having polymer chains of an alkylene oxide grafted onto the alkenyl aromatic hydrocarbon polymer, and pertains to a method of making the copolymers.

It is known to prepare polymers of ethylenically unsaturated organic compounds having conjugated double bonds at least one of which double bonds occurs in an aliphatic radical, by treating a monomer such as styrene, vinyltoluene, alpha-methyl styrene and the like, with organo-alkali metal compounds as the catalyst or polymerization initiator.

The solutions of polymers prepared in an anhydrous organic ether as the reaction medium are known to consist of polymer molecules having reactive negatively charged end groups and are referred to as "living" polymers. In other words, so long as the polymer is maintained in the ether solution free from contact with agents such as oxygen, water or carbon dioxide, which react with and kill the living polymer, the polymer molecules can grow further, by adding monomer to the solution and continuing the polymerization. Thus, polymeric bodies of monoalkenyl aromatic hydrocarbons such as styrene or alpha-methyl styrene can readily be prepared having a desired molecular weight by controlling the relative proportions of the catalyst material and the monomer employed, and the polymerization conditions.

It has now been discovered that polymeric compositions consisting essentially of block copolymers having a plurality of polymerized monoalkenyl aromatic hydrocarbon units as the base to which are chemically combined a plurality of oxyalkylene groups can readily be obtained by reacting the "living polymer," i.e. a polymerized monoalkenyl aromatic hydrocarbon having negatively charged end groups, with an alkylene oxide while having the reactants dissolved in a liquid solvent, e.g. an organic ether, such as an anhydrous liquid ether solvent in which the living polymer is prepared.

More specifically, the invention concerns polymeric compositions of matter of the block copolymer type which can be illustrated by the symbols $$B_x \cdot A_y \text{ or } A_y \cdot B_x \cdot A_y$$

wherein B represents a monoalkenyl aromatic hydrocarbon of the benzene series and $x$ is an integer such that the block of the B units in polymerized form has a molecular weight of at least 5000, and wherein A represents an oxyalkylene group containing from 2 to 4 carbon atoms and $y$ is an integer such that the blocks of the oxyalkylene groups in polymerized form having the formula $$-C_nH_{2n}(OC_nH_{2n})_m-OH$$

wherein $n$ is a whole number from 2 to 4, has an $m$ value of from 10 to 1000, and wherein the terminal carbon atom of the block of the polymerized oxyalkylene groups is directly attached to a terminal carbon atom of the block of the polymerized monoalkenyl aromatic hydrocarbon.

The polymeric compositions can contain in the block polymer molecule a segment of the polymerized monoalkenyl aromatic hydrocarbon units and one or two segments of the polymerized oxyalkylene units, and are block copolymers of the form $B_x \cdot A_y$ or $A_y \cdot B_x \cdot A_y$ depending upon whether the living B polymer chain contains one or both terminal carbon atoms having a negative charge.

The living B polymer starting material having reactive negative charged end groups to be employed can be prepared in known ways. In brief, a monoalkenyl aromatic resin having negatively charged end groups can be prepared by polymerizing a monomeric monoalkenyl aromatic hydrocarbon such as styrene, vinyltoluene, vinylxylene, isopropylstyrene, ethylvinylbenzene, alpha-methyl styrene, para-methyl-alpha-methyl styrene and the like having a single benzene nucleus and a single ethylenic double bond in conjugation with aromatic unsaturation in the benzene nucleus, in the presence of an anionic catalyst such as an alkali metal compound of aliphatic or aromatic hydrocarbons while having the reactants dissolved in a suitable solvent which is free or substantially free from impurities which act as terminators for the growing polymer chains having the negatively charged end group or groups.

Examples of suitable anionic catalyst materials are the addition compounds of alkali metals such as sodium, potassium or lithium with aliphatic or aromatic hydrocarbons, e.g. the addition compounds of sodium, potassium or lithium with phenanthrene, diphenyl, stilbene or alpha-methyl styrene or compounds like butyl lithium. The catalyst material is usually employed in amounts corresponding to from 0.0005 to 0.04 gram molecular proportion of the catalyst, i.e. the alkali metal complex, per gram molecular equivalent proportion of the monoalkenyl aromatic hydrocarbon to be polymerized.

The preparation of the B polymer starting material is carried out by polymerizing the monomeric monoalkenyl aromatic hydrocarbon in a suitable anhydrous organic solvent for the reactants and the catalyst and which is a liquid under the conditions employed, suitably an organic ether which is a solvent for the polymer and the catalyst material. Suitable solvents are aliphatic ethers such as dimethyl ether, methyl ethyl ether, methyl isopropyl ether, dimethyl ether of ethylene glycol or cyclic ethers, e.g. 1,4-dioxane, tetrahydropyrane, tetrahydrofurane, tetrahydro-2-methylfurane and the like. The polymerization of the monoalkenyl aromatic hydrocarbon to form the B polymer starting material can be carried out at temperatures between $-120°$ and $60°$ C., preferably from $-80°$ to $50°$ C., and at atmospheric, subatmospheric or superatmospheric pressure. The polymerization can be readily controlled to form the B polymer starting material having a desired molecular weight by controlling the proportions of the alkali metal addition compound employed as catalyst and the monomer, i.e. the catalyst to monomer ratio. The B polymers to be employed as starting materials are "living" polymers having an average molecular weight between 5,000 and about 150,000 or greater as determined by the scattering of light or other suitable methods.

The block copolymers of the invention are prepared by reacting the living B polymer with an alkylene oxide such as ethylene oxide, 1,2-butylene oxide or 1,2-propylene oxide, whereby the negatively charged end groups of the living B polymer chains chemically combine with the oxyalkylene group to form the corresponding hydroxy-alkyl radical of the formula $-C_nH_{2n}OH$ wherein $n$ is an integer from 2 to 4. The hydroxyalkyl radicals chemically combined with the B polymer molecules is reacted with more of the alkylene oxide to form polyoxyalkylene groups containing at least 10, preferably from 75 to 1000 oxyalkylene groups per chain.

The block copolymers of the invention consist essentially of a polymerized monoalkenyl aromatic hydrocarbon of the benzene series having an average molecular weight between 5,000 and 150,000 or greater as the B polymer portion thereof having chemically combined to at least one of the terminal carbons of the polymer chain a polyoxyalkylene radical of the formula $$-C_nH_{2n}(OC_nH_{2n})_m-OH$$

wherein $n$ is an integer from 2 to 4 and $m$ is a whole number between 10 and 1,000.

The reaction of the alkylene oxide with the living B polymer can be carried out at temperatures between 40° and 120° C. and at atmospheric or superatmospheric pressure, and the alkylene oxide is reacted with the living B polymer starting material in an amount sufficient to form the corresponding hydroxy-alkyl derivative of the desired composition.

The block copolymer product is recovered in usual ways, for example, by making the solution of the reacted material acidic with an aqueous solution of hydrochloric, hydrobromic or sulfuric acid, filtering the solution to remove precipitated salt and evaporating the filtered solution to recover the block copolymer product as residue. The copolymer can be recovered by precipitating it in a non-solvent such as hexane or heptane then separating, washing and drying the recovered product.

The block copolymers of the invention are solid materials. They are soluble in organic solvents such as toluene, benzene, methyl ethyl ketone, tetrahydrofurane or mixtures of such solvents and alcohols. The copolymers are useful for a variety of purposes, e.g. emulsifying agents. They can be molded by usual compression or injection molding operations or by extrusion methods to form sheet, boxes, rods, tubes, or plastic tile. They can be compounded with other thermoplastic resins, e.g. polystyrene, copolymers of styrene and rubber, copolymers of styrene and methylmethacrylate or copolymers of styrene and acrylonitrile to form compositions having little, if any, tendency to build up and hold a static charge of electricity.

Because of the hydrophile groups, i.e. the polyoxyalkylene groups chemically combined with the B polymer chains, the block copolymers of the invention are substantially immune to the build up of a static charge of electricity on surfaces of molded articles prepared therefrom. The block copolymers are useful for making sheet, film, boxes and other articles which are resistant to the build up of a charge of static electricity. The block copolymers are useful as intermediates in the preparation of other complex polymeric products, e.g. by reaction of the terminal —OH group in the block copolymer with acetic acid, propionic acid, acrylic acid or methacrylic acid.

The following examples illustrate ways in which the principle of the invention has been applied, but are not to be construed as limiting its scope.

EXAMPLE 1

Polystyrene consisting of "living" polymer chains was prepared by polymerizing styrene in anhydrous tetrahydrofurane solution in the presence of a catalytic amount of sodium alpha-methyl styrene complex at 0° C. The molecular weight of the resulting "living" polymer was calculated from the monomer to catalyst ratio to be 10,000. In each of three experiments, a charge of the solution of the "living" polystyrene of 10,000 molecular weight was mixed with ethylene oxide in proportions as stated in the following table. The mixture was sealed in a glass ampoule and heated for one week at a temperature of 75° C. Thereafter, the ampoule was cooled and opened. The resulting polymer was freed from solvent by heating it in vacuum. The residue was dissolved in benzene and recovered by freeze-drying. The condensation of the ethylene oxide was quantitative. The styrene-ethylene block polymers showed some unusual properties. Their solutions in methyl ethyl ketone or in tetrahydrofurane remained clear when diluted with methyl alcohol. This shows that the products are block copolymers. The methyl ethyl ketone turned cloudy when water was added, but no precipitate was formed. On the other hand, a white precipitate was formed on addition of a drop of water to a clear solution of the block copolymers in benzene. The products were soluble in methyl ethyl ketone and tetrahydrofurane. They did not precipitate when such solutions were diluted with methyl alcohol. The block copolymers were polystyrene having polyoxyethylene chains of the formula $-(C_2H_4O)_mH$ wherein $m$ represents the number of the oxyethylene units in the polyoxyethylene chains chemically attached to the terminal carbon atoms of the polystyrene molecule. Table I identifies the experiments and gives the parts by weight of the polystyrene and ethylene oxide employed in making the same. The table also gives the number $m$ for the oxyethylene units in the polyoxyethylene chains.

*Table I*

| Run No. | Starting Material | | Product |
|---|---|---|---|
| | "Living" Polystyrene Parts | Ethylene Oxide Parts | Number of Oxyethylene Groups $m$ |
| 1 | 3 | 1 | 76 |
| 2 | 1 | 1 | 227 |
| 3 | 1 | 3 | 682 |

Similar results are obtained when 1,2-propylene oxide or 1,2-butylene oxide are employed in place of the ethylene oxide used in the above example.

I claim:

1. A polymeric composition of matter consisting essentially of a block copolymer selected from the group consisting of block copolymers having the general formulae:

$$B_x \cdot A_y \text{ and } A_y \cdot B_x \cdot A_y$$

wherein B represents a monoalkenyl aromatic hydrocarbon of the benzene series and $x$ is an integer such that the block of said B units in polymerized form has a molecular weight of at least 5000, and wherein A represents an oxyalkylene group containing from 2 to 4 carbon atoms and $y$ is an integer such that the block of the oxyalkylene group in polymerized form having the formula $$-C_nH_{2n}(OC_nH_{2n})_m-OH$$

wherein $n$ is a whole number from 2 to 4, has an $m$ value of from 10 to 1000, and wherein the terminal carbon atom of the block of the polymerized oxyalkylene groups is directly attached to a terminal carbon atom of the block of the polymerized monoalkenyl aromatic hydrocarbon.

2. A polymeric composition of matter according to claim 1, wherein the alkylene oxide units are ethylene oxide.

3. A polymeric composition of matter according to claim 1, wherein the monoalkenyl aromatic hydrocarbon units are styrene.

4. A polymeric composition of matter consisting essentially of a block copolymer of styrene and ethylene oxide having the general formula:

$$A_y \cdot B_x \cdot A_y$$

wherein B represents the styrene unit and $x$ is an integer such that the block of said styrene units in polymerized form has a molecular weight of at least 5000, and wherein A represents the oxyethylene group and $y$ is an integer such that the blocks of the oxyethylene groups in polymerized form having the formula $$-C_2H_4(OC_2H_4)_m-OH$$

has an $m$ value of from 75 to 1000, and wherein the terminal carbon atom of the blocks of the polymerized oxyethylene groups are directly attached to the terminal carbon atoms of the block of the polymerized styrene.

References Cited in the file of this patent

UNITED STATES PATENTS 2,835,658     Lang ------------------ May 20, 1958

OTHER REFERENCES

Mark: Textile Research Journal, May 1953, pp. 294–298 (page 297 relied on).

Immergut et al.: Die makromolekulare Chemie, pp. 322–341, March 1956.